UNITED STATES PATENT OFFICE.

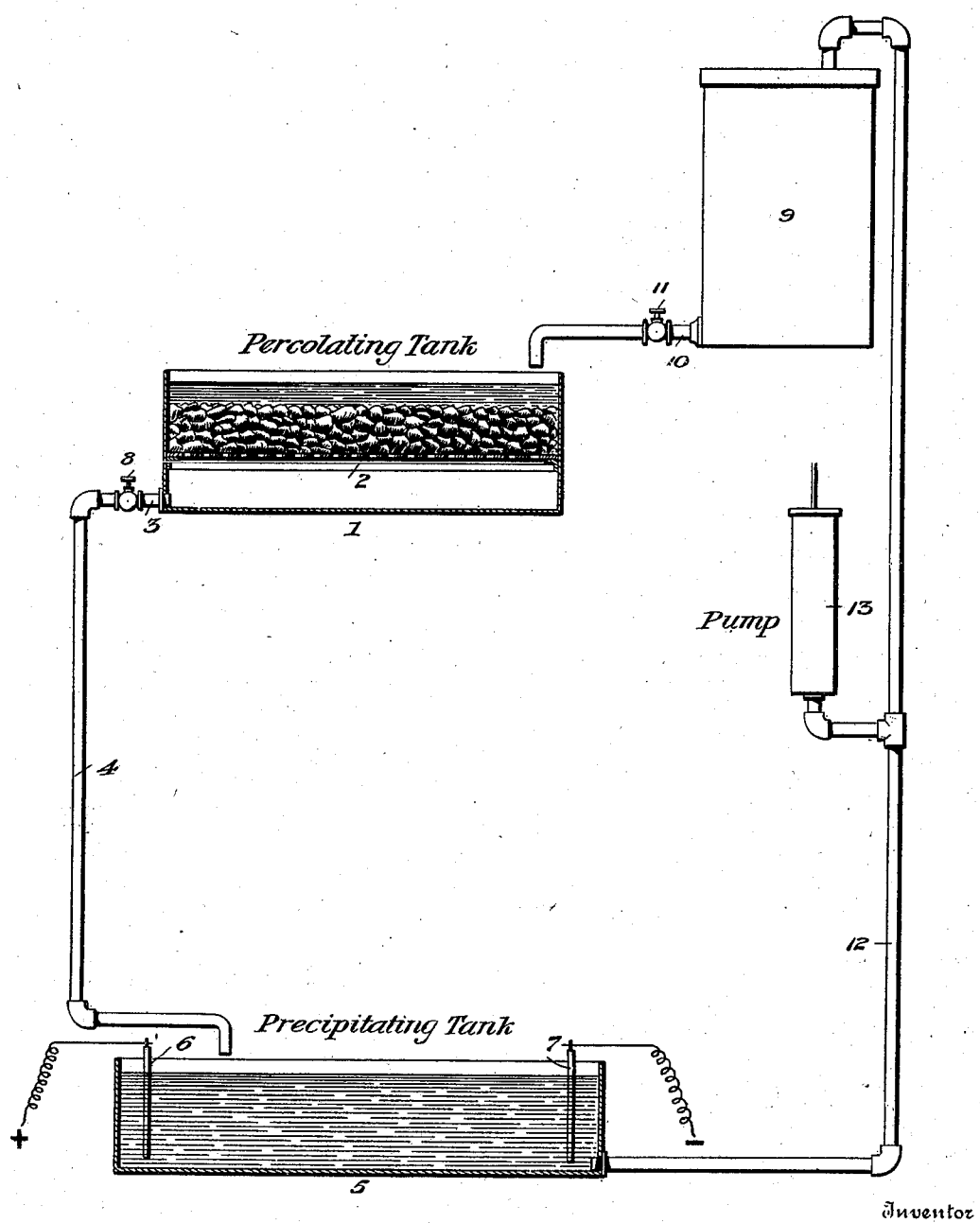

HENRY RIVES ELLIS, OF SALT LAKE CITY, UTAH.

PROCESS OF EXTRACTING COPPER FROM CARBONATE AND OXID ORES.

SPECIFICATION forming part of Letters Patent No. 725,548, dated April 14, 1903.

Application filed October 7, 1902. Serial No. 126,366. (No specimens.)

*To all whom it may concern:*

Be it known that I, HENRY RIVES ELLIS, a citizen of the United States, residing at Salt Lake City, in the county of Salt Lake and State of Utah, have invented certain new and useful improvements in processes for the extraction of copper from its carbonate and oxid ores and from material carrying carbonates or oxids of copper; and I do hereby declare that the following is a full, clear, and exact description of the invention, which will enable others skilled in the art to which it pertains to make and use the same.

The object of my invention is to extract copper from its carbonate and oxid ores and from tailings or other material carrying the carbonates or oxids of copper; and to this end my invention consists in the use of a cold or heated aqueous solution containing sodium carbonate or sodium bicarbonate or a mixture of the two, or a like use of the corresponding salts of potassium or a mixture of these sodium salts or either of them, as a solvent—for example, a mixture of the carbonate of soda with the bicarbonate of soda, or a mixture of the carbonate of soda with the carbonate or bicarbonate of potash, or a mixture of the bicarbonate of soda with the bicarbonate of potash, or of the carbonate of potash with the bicarbonate of potash.

In carrying my invention into effect and in the practical working of my process the ores or product or material carrying copper in the form of carbonates or oxids is first crushed or ground to a greater or less degree of fineness, if not before so reduced. This crushed material is then placed in a suitable tank, vat, or other suitable vessel and is subjected to a cold or heated aqueous solution of the carbonate or bicarbonate of soda or a mixture of the two or the corresponding salts of potassium. The solution is permitted to percolate the material by gravity, or the percolation may be expedited by pressure, or the material and solution may be treated by agitation by any of the ordinary methods, such as mechanical agitators, revolving barrels, or compressed air or steam. These solutions dissolve the carbonates and oxids of copper, and the copper-charged solution is then drawn off into a suitable precipitating tank or vessel and the copper in metallic form extracted by electrolysis in the usual and well-known way. The solution is then returned to the crushed ore or other material and used for a further extraction of copper and the operation repeated until all of the carbonates and oxids of copper shall have been practically dissolved.

The accompanying drawing shows an apparatus which may be used in carrying out my process, the tanks being shown in section, the arrangement of the tanks and their connecting-pipes being shown diagrammatically.

In the drawing, 1 represents a percolating-tank having a false bottom 2, of perforated material, to support the crushed ore or other material to be treated. An outlet 3, below the false bottom, is connected by a pipe 4 with the precipitating-tank 5, which may be provided with anode 6 and cathode 7. The pipe 4 is preferably provided with a valve or cock 8. A supply-tank 9 for containing the solvent solution is preferably so located that its outlet 10, controlled by valve 11, discharges into the percolating-tank 1. A return-pipe 12, preferably provided with a pump 13, leads from the precipitating-tank to the supply-tank 9 for returning the solution for reuse after the copper has been precipitated.

It will be understood that the apparatus shown and described is illustrative merely, and I do not desire to be limited to the form or arrangement of the apparatus shown.

When electricity is employed to precipitate the copper, I prefer to use a carbon or iron anode, though any anode may be used which is practically insoluble in the solution. If the extraction in the form of metallic copper is found to be impractical or inconvenient for want of a suitable source of current-supply, the copper may be recovered from the solution by throwing it down as a sulfid by adding to the copper-charged solution a soluble sulfid—such, for example, as the sulfid of sodium, potassium, or calcium. The sulfid of copper thus precipitated may be allowed to settle or be separated by filtration and the clear carbonate solution returned to the crushed material for a further extraction of copper until the carbonates and oxids of the crushed material are practically dissolved.

So far as the generic process of this application is concerned the carbonate or bicarbonate of potash is to be regarded as the equivalent of the corresponding salt of soda, although it is to be understood that, specifically considered, they are not in all respects equivalents.

Where the ore or material contains only the carbonates of copper, I prefer to use the aqueous solution containing carbonate of soda or carbonate of potash only; but where the ore or material carries both carbonates and oxids of copper or oxids of copper only I prefer to use a mixture of the carbonate and bicarbonate of soda or of the carbonate and bicarbonate of potash or a mixture of these sodium salts or either of them with the potassium salts or either of them—for example, a mixture of the carbonate of soda with the carbonate or bicarbonate of potash or a mixture of the bicarbonate of potash with the bicarbonate of soda. I prefer to use very strong and heated solutions, as their action is more rapid. These carbonate solutions may also be used as herein set forth to extract copper from ores and tailings carrying the precious metals to prepare such materials for treatment for the recovery of the gold and silver by other processes—for example, the cyanid process.

I do not claim any particular method or device for subjecting such crushed ores of copper or tailings or material carrying carbonate of oxids of copper either by agitation or percolation by gravity or percolation under pressure, nor do I claim any particular method of recovering the metallic copper by electrolysis from the copper-charged carbonate solution nor any particular method for precipitating the copper from the carbonate solution in the form of copper sulfid by the use of a soluble sulfid.

Having fully described my invention, what I claim, and desire to secure by Letters Patent, is—

1. The process of extracting copper from its carbonate and oxid ores and from material carrying carbonate or oxid of copper, which consists in treating such ores or material with an aqueous solution containing a carbonate of soda or its described equivalent; substantially as described.

2. The process of extracting copper from its carbonate and oxid ores and from material carrying carbonate or oxid of copper which consists in treating such ores or material with an aqueous solution containing the carbonate and bicarbonate of soda or its described equivalent; substantially as described.

3. The process of extracting copper from its carbonate and oxid ores and from material carrying carbonates or oxids of copper, which consists in treating such ores or material with an aqueous solution containing a carbonate of soda; substantially as described.

4. The process of extracting copper from its carbonate and oxid ores and from material carrying carbonate or oxid of copper which consists in treating such ores or material with an aqueous solution containing a mixture of a carbonate of soda and a carbonate of potash; substantially as described.

5. The process of extracting copper from its carbonate and oxid ores and from material carrying carbonate or oxid of copper which consists in treating such ores or material with an aqueous solution containing a mixture of the carbonate and bicarbonate of soda and the carbonate of potash; substantially as described.

6. The process of extracting copper from its carbonate and oxid ores and from material carrying carbonate or oxid of copper which consists in treating such ores or material with an aqueous solution containing a mixture of the carbonate and bicarbonate of soda and the carbonate and bicarbonate of potash; substantially as described.

7. The process of extracting and recovering copper from its carbonate or oxid ores or from material carrying carbonates or oxids of copper, which consists in subjecting the ore or other material in a crushed or powdered state to the action of a carbonate of soda or its described equivalents until the copper is dissolved and subsequently subjecting the charged solution to electrolytic action; substantially as described.

In testimony whereof I, HENRY RIVES ELLIS, affix my signature, in presence of two witnesses, this 22d day of September, 1902.

HENRY RIVES ELLIS.

Witnesses:
J. B. THOMPSON,
W. H. DICKSON.